(12) United States Patent
Xia

(10) Patent No.: US 9,860,307 B2
(45) Date of Patent: Jan. 2, 2018

(54) SYSTEM AND METHOD FOR VIRTUAL DESKTOP INFRASTRUCTURE USER LEVEL VIRTUAL CHANNEL

(71) Applicant: Futurewei Technologies, Inc., Plano, TX (US)

(72) Inventor: Guangsong Xia, Fremont, CA (US)

(73) Assignee: Futurewei Technologies, Inc., Plano, TX (US)

( * ) Notice: Subject to any disclaimer, the term of this patent is extended or adjusted under 35 U.S.C. 154(b) by 293 days.

(21) Appl. No.: 14/516,199

(22) Filed: Oct. 16, 2014

(65) Prior Publication Data

US 2016/0112540 A1 Apr. 21, 2016

(51) Int. Cl.
*H04L 29/08* (2006.01)
*H04L 29/06* (2006.01)

(52) U.S. Cl.
CPC .............. *H04L 67/10* (2013.01); *H04L 69/16* (2013.01)

(58) Field of Classification Search
CPC ....................................................... H04L 67/10
USPC ........................................................ 709/203
See application file for complete search history.

(56) References Cited

U.S. PATENT DOCUMENTS

2012/0317295 A1* 12/2012 Baird ...................... H04L 67/38
709/228
2015/0237097 A1* 8/2015 Devireddy .............. H04L 65/60
709/203

* cited by examiner

*Primary Examiner* — Adnan Mirza
(74) *Attorney, Agent, or Firm* — Slater Matsil, LLP

(57) ABSTRACT

Embodiments for provided for using virtual desktop infrastructure (VDI) user level virtual channels (VCs) which allows client data prioritization within a Transmission Control Protocol (TCP) connection to a client. An embodiment method includes establishing a communication module at a user level of operation of a server, and establishing a TCP connection between the server and a client device. Additionally, the server establishes, at the user level of operation, a plurality of VCs for a plurality of respective services provided to the client device. The communication module at the user level communicates with service modules running at the server for executing the services. The data of the VCs are arranged into a plurality of respective priority queues according to priority of the services. The communication module exchanges the data of the services in the VCs on the TCP connection with the client device according to the priority queues.

22 Claims, 4 Drawing Sheets

SYSTEM AND METHOD FOR VIRTUAL DESKTOP INFRASTRUCTURE USER LEVEL VIRTUAL CHANNEL

TECHNICAL FIELD

The present invention relates to network communications and virtualization, and, in particular embodiments, to a system and method for virtual desktop infrastructure (VDI) user level virtual channel.

BACKGROUND

A virtual desktop infrastructure (VDI) is an infrastructure that allows a user or client device to access, via a network, a virtual machine (VM) at a remote server to process and display graphics (e.g., video graphics) and other data, such as audio/video data. The graphics are processed at the VM or remote server and then displayed remotely at the user or client device. For example, the client device communicates with the VM at the remote server using a Transmission Control Protocol (TCP) to display video via a web browser application. The TCP connection can carry different types of data, such as display data, audio/video data, web browsing data, or other data. The different data types may have different priority, such as for quality of service (QoS). For example, printer data typically has lower priority than real-time video/audio service data. There is a need for a mechanism that allows user or client data prioritization within a TCP connection for remote VDI processing.

SUMMARY OF THE INVENTION

In accordance with an embodiment, a method by a server for handling client data in a virtual desktop infrastructure (VDI) environment includes establishing a communication module at a user level of operation of the server, establishing a connection between the server and a client device, and establishing, at the user level of operation of the server, a plurality of virtual channels (VCs) for a plurality of respective services provided to the client device. The communication module at the user level communicates with service modules running at the server for executing the services. The method further includes arranging data of the VCs into a plurality of respective priority queues according to priority of the services, and exchanging, using the communication module, the data of the services in the VCs on the connection with the client device according to the priority queues.

In accordance with another embodiment, a method by a VM for handling client data in a VDI environment includes establishing a Transmission Control Protocol (TCP) connection with a client, and establishing, at a user level of operation of the VM, a VC for each service provided by the VM to the client over the TCP connection. The method further includes establishing a named pipe for each VC, and establishing a priority queue for the VC for handling services data for the client according to priority of data services. The named pipe allows communications with executable files for the service associated with the VC. The data associated with the VC is received over the TCP connection from the client, read into the priority queue for the VC, and then read, according to the priority of data services, from the priority queue of the VC into the named pipe for the VC. The data in the named pipe is then processed using the executable files.

In accordance with yet another embodiment, a network component for handling client data in a VDI environment comprises a processor and a computer readable storage medium storing programming for execution by the processor. The programming includes instructions to establish a communication module at a user level of operation of the network component, establish a connection between the network component and a client device, and establish, at the user level of operation of the network component, a plurality of VCs for a plurality of respective services provided to the client device. The programming includes further instructions to communicate, using the communication module at the user level, with service modules running at the network component for executing the services, arrange data of the services into a plurality of respective priority queues according to priority of the services, and exchange, using the communication module, the data of the services on in VCs on the connection with the client device according to the priority queues.

The foregoing has outlined rather broadly the features of an embodiment of the present invention in order that the detailed description of the invention that follows may be better understood. Additional features and advantages of embodiments of the invention will be described hereinafter, which form the subject of the claims of the invention. It should be appreciated by those skilled in the art that the conception and specific embodiments disclosed may be readily utilized as a basis for modifying or designing other structures or processes for carrying out the same purposes of the present invention. It should also be realized by those skilled in the art that such equivalent constructions do not depart from the spirit and scope of the invention as set forth in the appended claims.

BRIEF DESCRIPTION OF THE DRAWINGS

For a more complete understanding of the present invention, and the advantages thereof, reference is now made to the following descriptions taken in conjunction with the accompanying drawing, in which.

Corresponding numerals and symbols in the different figures generally refer to corresponding parts unless otherwise indicated. The figures are drawn to clearly illustrate the relevant aspects of the embodiments and are not necessarily drawn to scale.

DETAILED DESCRIPTION OF ILLUSTRATIVE EMBODIMENTS

The making and using of the presently preferred embodiments are discussed in detail below. It should be appreciated, however, that the present invention provides many applicable inventive concepts that can be embodied in a wide variety of specific contexts. The specific embodiments discussed are merely illustrative of specific ways to make and use the invention, and do not limit the scope of the invention.

Disclosed herein are system and method embodiments for providing a VDI user level virtual channel (VC) which allows client data prioritization within a TCP connection. The VC is associated with client communication with a VM through a TCP/Internet Protocol (IP) connection or similar connections. A plurality of VCs associated with a remote client can be established between a VM (e.g., at a server) on the network side and the remote client, e.g., via a TCP network or a TCP connection. Each VC can carry data connections with corresponding priorities that are arranged in a respective priority queue at the user level of the operating system (OS), also referred to as user space. The user level or space of the OS allows implementing services for users using application or programs that can be developed by developers, e.g., third parties. This resolves the handling of different priority data in VDI communications via TCP or similar connections at the user level, which is easier to develop and maintain than the kernel level of the OS.

Specifically, a communication module is established on the VM side to handle the VCs over TCP/IP connections. The communication module is located at the user level of VM's operations (user level of the VM's OS), e.g., in the form of applications or programs that run on the user level of the OS. The communication module 131 is configured to maintain the priority queues of the VCs, and communicate, via corresponding named pipes, with other modules at the user level of the OS for handling multiple services, such as data/audio/video services. Additionally, a shared memory, which resides at the kernel, is used as a buffer pool allowing services at the kernel and the user level to share data. For example, a display driver at the kernel can access the shared memory to use shareable information with the client service modules if needed. The buffer pool can be pre-allocated to reduce memory allocation overhead.

Figure 1:
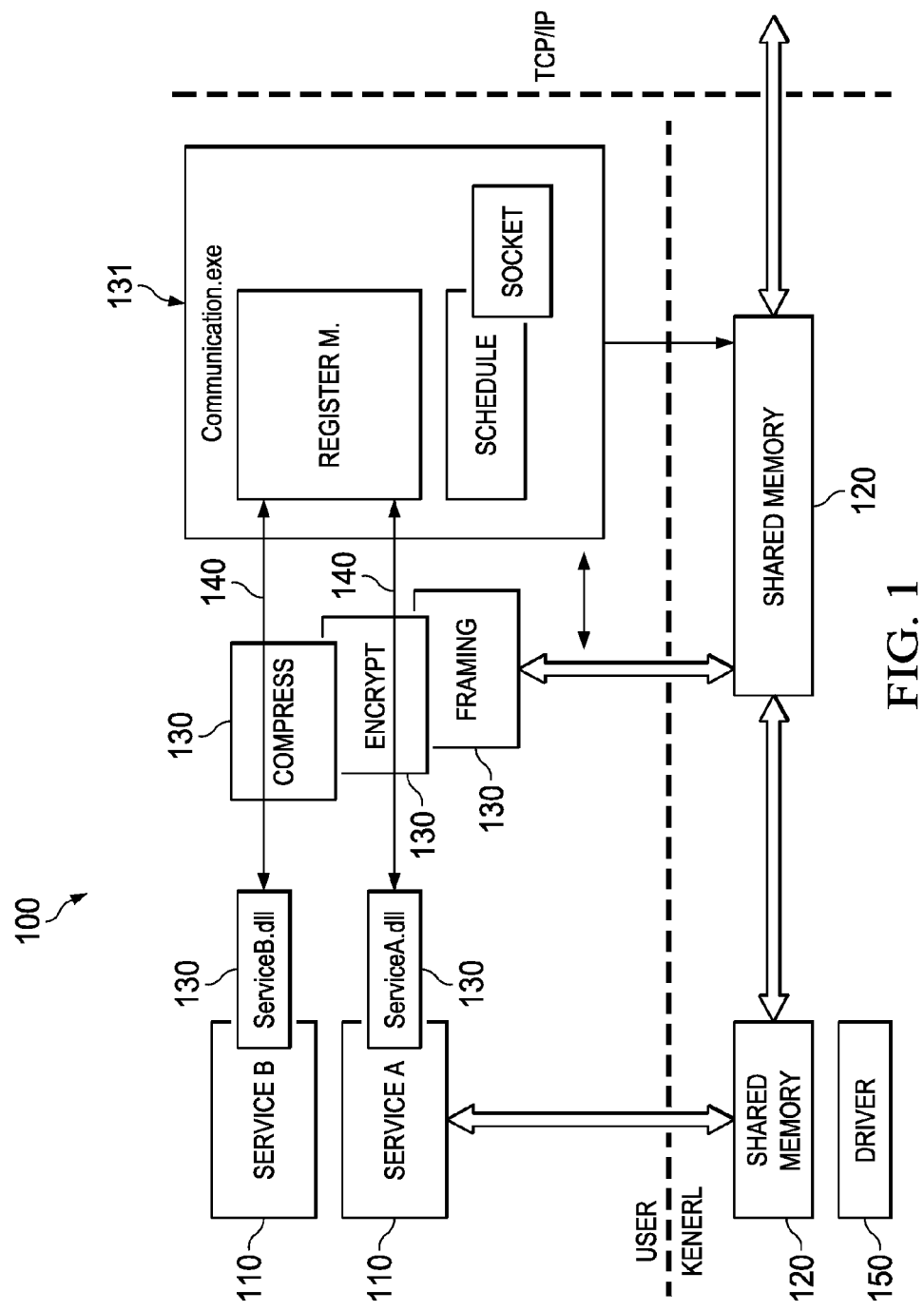
FIG. 1 illustrates an embodiment of a system for using virtual channels (VCs) at the user level at a VDI virtual machine (VM) to handle client services.

FIG. 1 shows an embodiment of a system 100 for using VCs at the user level at the VM to handle services in VDI environment. The services are communicated between the VM and the client side via a TCP/IP connection, for example. The client can be any device that establishes the connection with the VM using TCP, such as a thin client device (e.g., a computer tablet) or a client computing device (e.g., a laptop or desktop computer). The client can also be connected to a peripheral device, e.g., a printer).

The services, at the VM or server, need to communicate with the client device. Specifically, a VC is established for this purpose for each service. The VCs of the different services can have different priority according to the services. Examples of the services include web browser, audio, and video services. The system 100 includes kernel level operations and user level operations. At the user level, a communication module 131 is implemented via software such as an executable file (communication.exe) or alternatively a dynamic-link library (dll) file to communicate with executable files 130 for processing different user level services 110 (e.g., service A and service B). The communications module 131 communicates with each service 110 via respective name pipes 140. A named pipe is an inter-process communication mechanism used by a process to communicate with another process and is deleted once it is no longer being used. Processes generally attach to the named pipes (usually appearing as a file) to perform inter-process communication.

For example, in the case a printer device is connected to the remote client device, the printer device can be redirected to the VM through a VDI protocol using a respective VC. As such, the VM views the printer as a local printer and can issue printing jobs to the printer. The print job data is intercepted by a printer service (e.g., service A in FIG. 1) and transmitted to the client side. The priority of the printer VC may be lower than other services, such as an audio service (e.g., service B). The printer service establishes a named pipe with the communication module 131 and sends data to the module. The audio service also establishes a respective named pipe to exchange its data with the communication module 131. The module 131 decides which service data to send to the client first according to priority. The named pipes 140 also allow the communication module 131 to exchange data with the executable files 130 for the respective the services 110.

A service 110 is a user level service that uses a VC established by the communication module 131, and hence becomes a VC user. An executable file (e.g., serviceA.dll and serviceB.dll) is established for each user level service 110 to perform the service's operations. For example, a serviceA.dll is established to perform printer related operations for a printer service (service A). The service 110 can include different parts, such as compress, encrypt, and framing services executable by the files 130. Further, the communication module 131 and a kernel level service 150 (e.g., a display service) can access a shared memory 120, e.g., a shared buffer pool, which allows accessing common or shareable data if needed. The shared memory 120 can be pre-allocated at the kernel.

The VC for a service is associated with a plurality of data items that correspond to a client (e.g., a device communicating with the VM). The communication module 150 uses the TCP/IP connection, e.g., via programming using a socket module (e.g., in the module 131 or file communication/.exe), to communicate with the client device. The TCP/IP communication comprises content from all the established VCs. Each VC is assigned an ID, and the data of that VC can be framed in the form of [VC ID][length][data]. When data of multiple VCs exist for transmission (e.g., via the socket at the communication module 131) to the client, the priority of such data is taken into account. The shared memory 120 operates independent of the socket operation. The shared memory 120 is used by the kernel VC user to share its data with the communication.exe. The communication module 131 (e.g., a communication.exe file) also comprises or uses a register module and a scheduler module. The register module is used to register a VC user to the communication module 131. After registration, the service module 110 becomes a VC user. The scheduler module is used to handle the data from multiple VC users, such as when to send the data out to the remote client.

Figure 2:
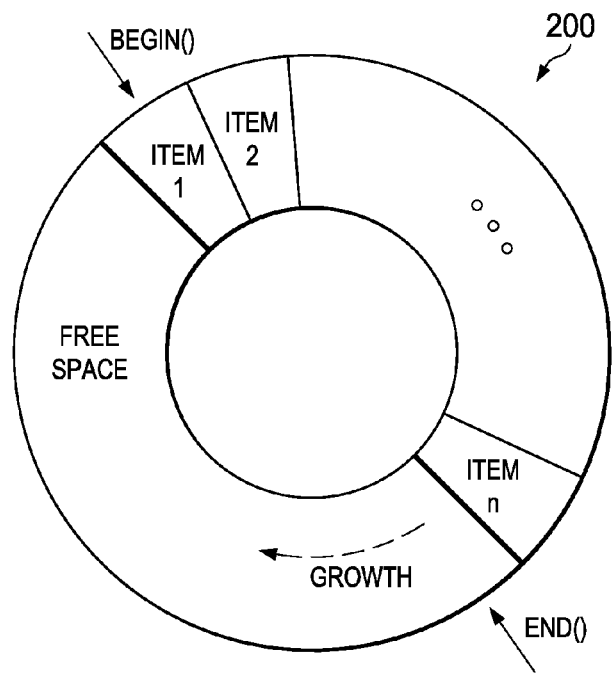
FIG. 2 illustrates an embodiment of a priority queue for a VC.

To take data priority into account when exchanging VC data with the client, the communication module 131 maintains priority queues for the VCs where the data items of the VCs are arranged according to priority of the VCs. For example, a plurality of queues are arranged in priority. Each queue corresponds to one of the VCs. The data in the higher priority queues are processed or transferred first. FIG. 2 shows an embodiment of a priority queue 200 for a VC. The priority queue 200 maintains the data items in an order according to priority, where higher priority data items are arranged higher in the queue 200, and hence may be fetched/placed/processed first. The queue 200 may have room to grow, in the form of addition pre-allocated free memory space.

Figure 3:
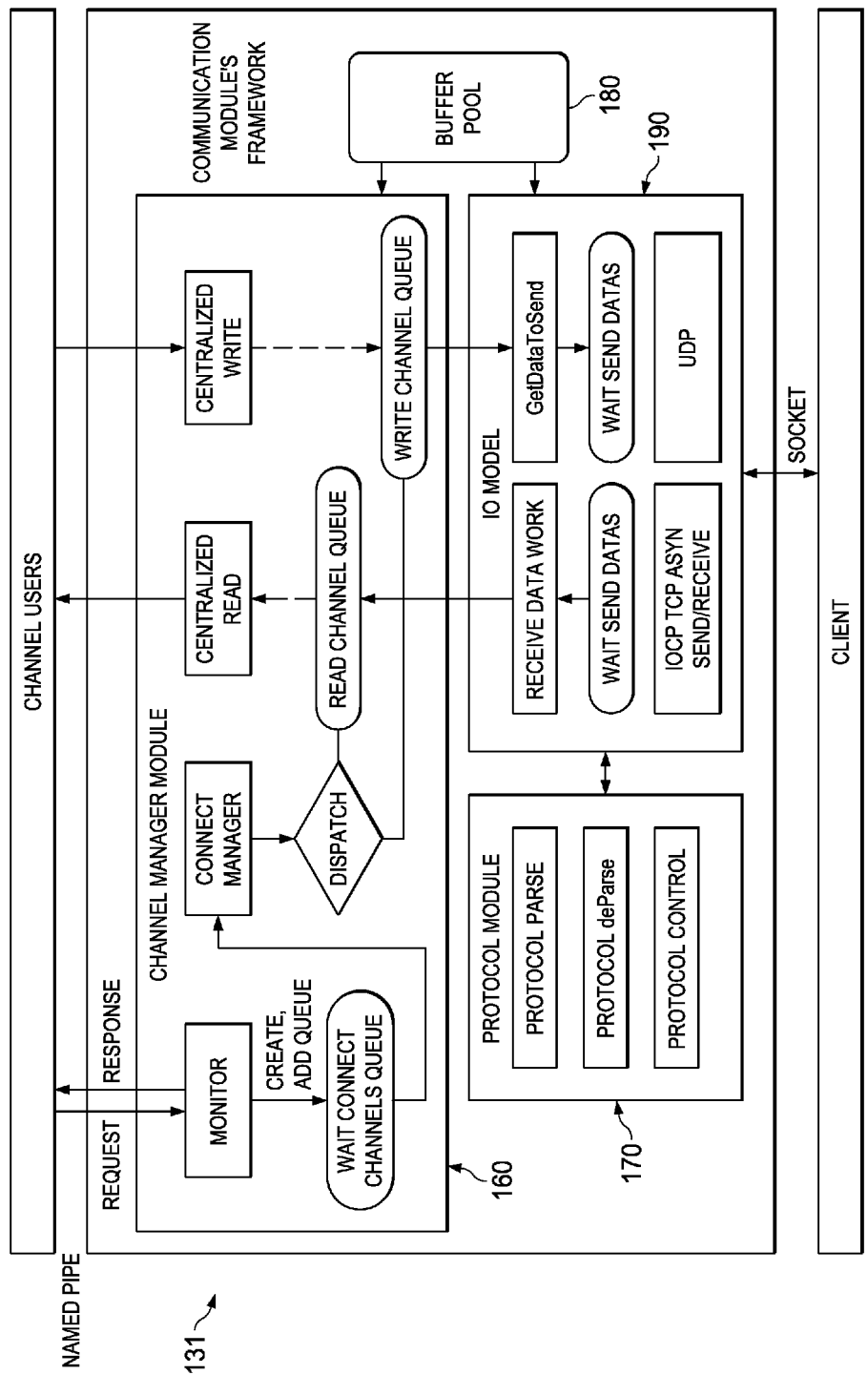
FIG. 3 illustrates an embodiment of a communication module for establishing VCs and handling client services in VDI environment.

FIG. 3 shows more details of implementation of the communication module 131 according to an embodiment of the disclosure. The communication module 131 includes an Input/Output (IO) module 190 that interfaces with the client, via a TCP/IP connection or other suitable connection, such as in the form of User Datagram Protocol (UDP) messages. The IO module 190 exchanges the data between the client and a channel manager module 160 at the communication module 131. The IO module 190 also communicates with a protocol module 170 that parses and controls the different protocols for the client data. The IO module 190 receives the data sequentially from the socket. Each segment of data may belong to different VCs and thus contains a VC ID identifying its VC. At the channel manager module 160, the data is then put into different VC queues according to the VC ID. The data priority is considered after the data is placed into its corresponding queue. Accordingly, data with higher priority queue are processed first by sending the data to its VC user through the respective named pipe. After processing the data, the data is also written from the VC user (via the named pipe 140) to the corresponding queue, and from the queue to the IO module 190, to be then sent (via the TCP/IP connection) to the respective client. The channel manager module 160 monitors the VCs and controls when to read and write the data of the VC, e.g., using a connection manager, according to the priority queue. The data of the VCs, or at least a portion thereof, is also stored in the shared buffer pool 180 (in the shared memory 120).

Figure 4:
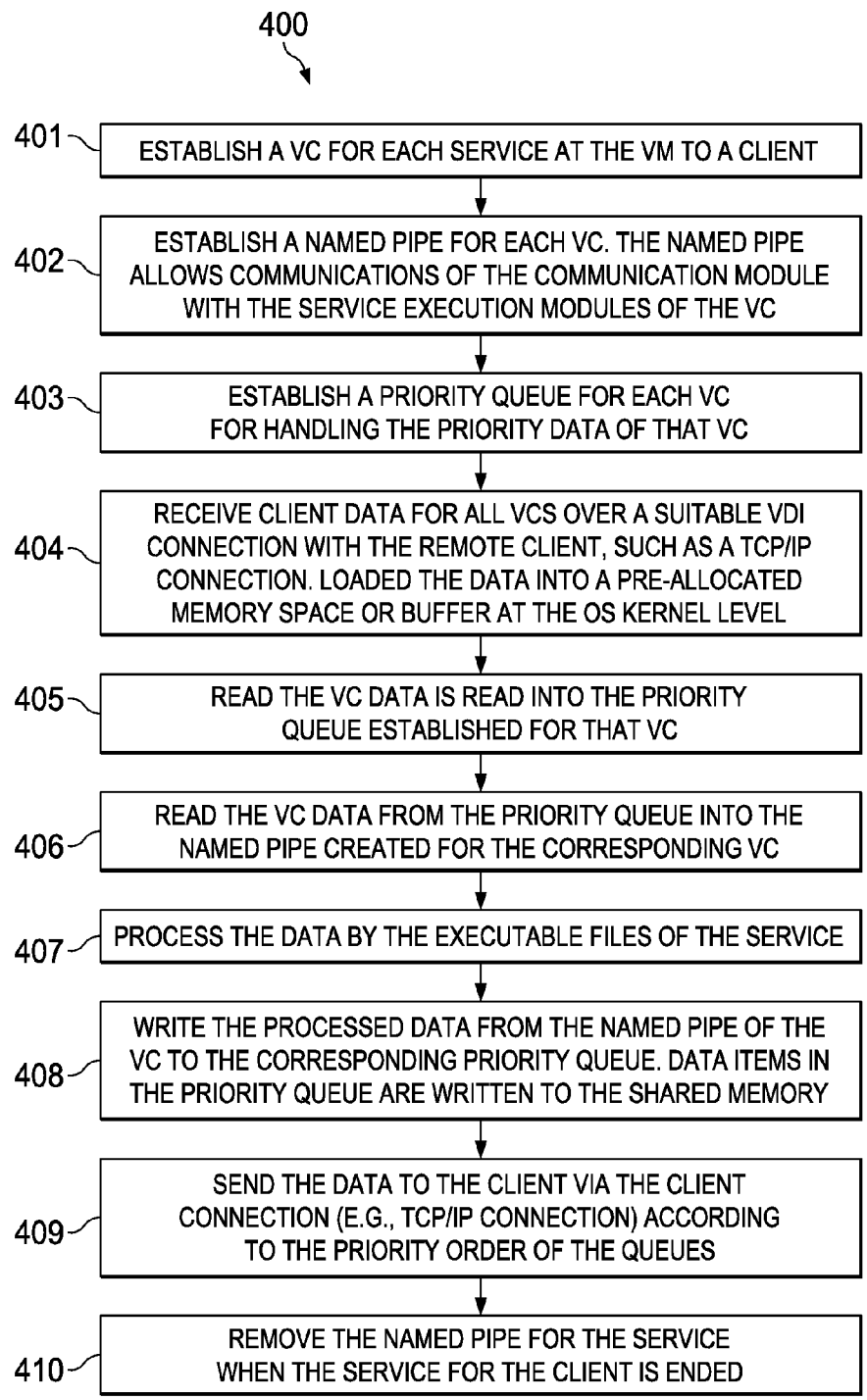
FIG. 4 illustrates an embodiment method for using VCs at the user level of a VM to handle client services in VDI environment.

FIG. 4 shows an embodiment of a method 400 for using VCs at the OS user level of a VM which handles services in VDI environment. For instance, the method 400 is implemented using the communication module 131 at a VM or VDI server in communication with remote clients. At step 401, a VC is established for each service at the VM to a client. The services are associated with a client device, such as a printer service, an audio service, and/or a video service for that client for example. Each service at the VM is thus treated as a VC user. Each VC is also assigned a VC ID. At step 402, a named pipe is established for each VC. The named pipe allows communications of the communication module with the service execution modules of the VC. At step 403, a priority queue is established for each VC for handling the priority data of that VC. At step 404, client data for all VCs is received over a suitable VDI connection with the remote client, such as a TCP/IP connection. The data is loaded into a pre-allocated memory space or buffer at the OS kernel level. The memory space or buffer is shareable between kernel level services, user level services, and the communication module. At step 405, the VC data is read into the priority queue established for that VC. The queue arranges the data according to data priority. At step 406, the VC data is read from the priority queue into the named pipe created for the corresponding VC. At step 407, the data is processed by the executable files of the service. The data in the shared memory can be processed by kernel services during the processing at the user level. At step 408, the processed data is written from the named pipe of the VC to the corresponding priority queue. The data items in the priority queue are written to the shared memory. At step 409, the data is sent to the client via the client connection (e.g., TCP/IP connection) according to the priority order of the queues. For example, data items in the queue of an audio service are given higher priority for transmission to the client than the data items in a queue for the client's printer service. At step 410, the named pipe for the service is removed when the service for the client is ended.

Figure 5:
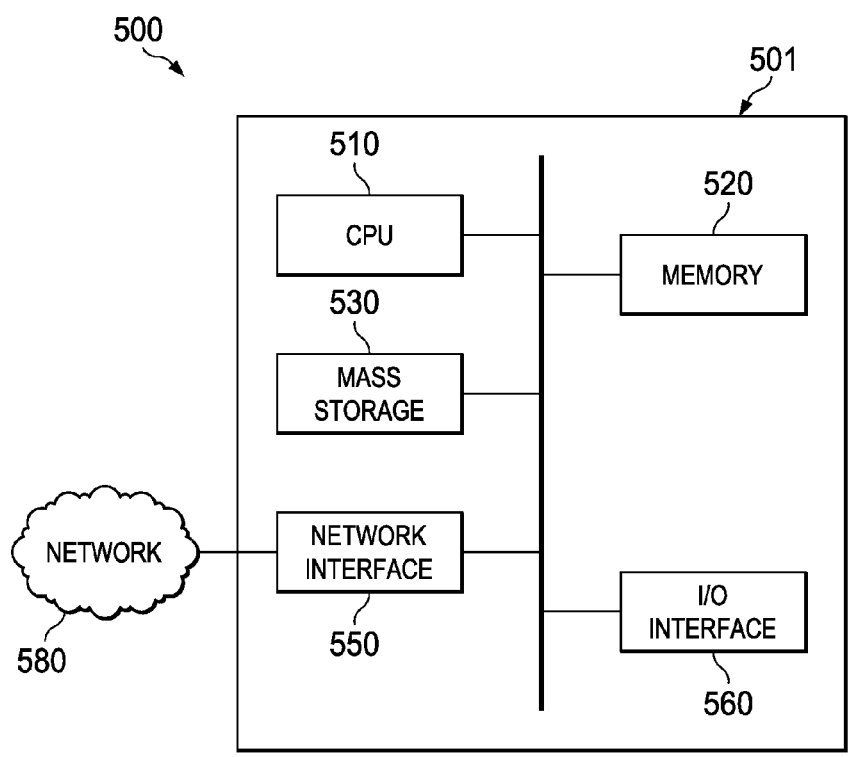
FIG. 5 is a diagram of a processing system that can be used to implement various embodiments.

FIG. 5 is a block diagram of a processing system 500 that can be used to implement various embodiments. For instance the processing system 500 can be part of a server at the network part, or of a user device. Specific devices may utilize all of the components shown, or only a subset of the components, and levels of integration may vary from device to device. Furthermore, a device may contain multiple instances of a component, such as multiple processing units, processors, memories, transmitters, receivers, etc. The processing system 500 may comprise a processing unit 501 equipped with one or more input/output devices, such as a speaker, microphone, mouse, touchscreen, keypad, keyboard, printer, display, and the like. The processing unit 501 may include a central processing unit (CPU) 510, a memory 520, a mass storage device 530, and an I/O interface 560 connected to a bus. The bus may be one or more of any type of several bus architectures including a memory bus or memory controller, a peripheral bus, a video bus, or the like.

The CPU 510 may comprise any type of electronic data processor. The memory 520 may comprise any type of system memory such as static random access memory (SRAM), dynamic random access memory (DRAM), synchronous DRAM (SDRAM), read-only memory (ROM), a combination thereof, or the like. In an embodiment, the memory 520 may include ROM for use at boot-up, and DRAM for program and data storage for use while executing programs. In embodiments, the memory 520 is non-transitory. The mass storage device 530 may comprise any type of storage device configured to store data, programs, and other information and to make the data, programs, and other information accessible via the bus. The mass storage device 530 may comprise, for example, one or more of a solid state drive, hard disk drive, a magnetic disk drive, an optical disk drive, or the like.

The I/O interface 560 provides interfaces to couple external input and output devices to the processing unit. Other devices may be coupled to the processing unit 501, and additional or fewer interface cards may be utilized. For example, a serial interface card (not shown) may be used to provide a serial interface for a printer.

The processing unit 501 also includes one or more network interfaces 550, which may comprise wired links, such as an Ethernet cable or the like, and/or wireless links to access nodes or one or more networks 580. The network interface 550 allows the processing unit 501 to communicate with remote units via the networks 580. For example, the network interface 550 may provide wireless communication via one or more transmitters/transmit antennas and one or more receivers/receive antennas. In an embodiment, the processing unit 501 is coupled to a local-area network or a wide-area network for data processing and communications with remote devices, such as other processing units, the Internet, remote storage facilities, or the like.

While several embodiments have been provided in the present disclosure, it should be understood that the disclosed systems and methods might be embodied in many other specific forms without departing from the spirit or scope of the present disclosure. The present examples are to be considered as illustrative and not restrictive, and the intention is not to be limited to the details given herein. For example, the various elements or components may be combined or integrated in another system or certain features may be omitted, or not implemented.

In addition, techniques, systems, subsystems, and methods described and illustrated in the various embodiments as discrete or separate may be combined or integrated with other systems, modules, techniques, or methods without departing from the scope of the present disclosure. Other items shown or discussed as coupled or directly coupled or communicating with each other may be indirectly coupled or communicating through some interface, device, or intermediate component whether electrically, mechanically, or otherwise. Other examples of changes, substitutions, and alterations are ascertainable by one skilled in the art and could be made without departing from the spirit and scope disclosed herein.

What is claimed is:

1. A method by a server for handling client data in a virtual desktop infrastructure (VDI) environment, the method comprising:
 establishing a network connection with a plurality of virtual channels (VCs) between the server and a client device, wherein the server comprises an operating system, wherein the server is configured to operate at a user level of the operating system, and wherein the client device is configured to communicate with the server using the network connection;
 establishing, by the server at the user level of the operating system, a plurality of priority queues corresponding to the plurality of VCs for a plurality of respective services provided to the client device, wherein each of the plurality of VCs comprises a VC priority;
 receiving a first data item from the client device using the network connection, wherein the first data item is associated with a first VC in the plurality of VCs and comprises a first data priority;
 storing the first data item in a first priority queue in the plurality of priority queues corresponding to the first VC at a position relative to other data items in the first priority queue according to the first data priority; and
 processing the plurality of priority queues according to respective VC priorities, wherein data items in each of the plurality of priority queues are processed according to respective data priorities,
 wherein the user level of the operating system is different than a kernel level of the operating system.

2. The method of claim 1, wherein the network connection is a Transmission Control Protocol (TCP) connection.

3. The method of claim 1, further comprising establishing, at the kernel level of the operating system, a shared memory space for executing the services, wherein the shared memory space at the kernel level is sharable by service modules and kernel modules.

4. The method of claim 3, wherein the user level of the operating system includes a socket module, a register module, and a schedule module, and wherein the method further comprises:
 communicating and exchanging data of the services with the client device over the network connection using the socket module;
 registering the plurality of VCs with the user level of the operating system using the register module; and
 scheduling sending the data from the plurality of VCs to the client device using the schedule module.

5. The method of claim 4, wherein the socket module operates independent of accessing the shared memory space.

6. The method of claim 1, further comprising:
 establishing a plurality of named pipes corresponding to the services; and
 communicating, via the named pipes, with service modules for executing the services.

7. The method of claim 1, further comprising:
 assigning a plurality of VC IDs for the respective VCs; and
 framing data of the services on the respective VCs as a combination of the VC IDs and the data of the respective services.

8. The method of claim 1, wherein the user level of the operating system comprises an executable file at an operation system (OS) user layer of the server.

9. The method of claim 1, wherein the user level of the operating system includes a channel manager module, an input and output (IO) module, and a protocol module, and wherein the method further comprises:
 exchanging, using the IO module, data of the services between the client device and the channel manager module;
 parsing and controlling protocols for the exchanged data using the protocol module; and
 transporting the data between the IO module, the priority queues, and the plurality of VCs using the channel manager module.

10. A method by a virtual machine (VM) for handling client data in a virtual desktop infrastructure (VDI) environment, the method comprising:
 establishing a Transmission Control Protocol (TCP) connection with a plurality of virtual channels (VCs) with a client device, wherein the VM comprises an operating system, wherein the VM is configured to operate at a user level of the operating system, and wherein the client device is configured to communicate with the VM using the TCP connection;
 establishing, at the user level of the operating system, a VC for each service provided by the VM to the client device over the TCP connection, wherein the VC for each service comprises a VC priority;
 establishing a named pipe for each VC, wherein the named pipe allows communications with executable files for the service associated with the VC;
 establishing at the user level of the operating system, a priority queue for each VC for handling services data for the client device according to each VC priority;
 receiving, over the TCP connection from the client device, a first data item associated with a first VC and comprising a first data priority;
 reading the first data item into a first priority queue corresponding to the first VC;
 reading, according to the first data priority, the first data item from the first priority queue of the first VC into a first named pipe corresponding to the first VC; and
 processing the first data item in the first named pipe using the executable files, wherein the user level of the operating system is different than a kernel level of the operating system.

11. The method of claim 10, further comprising:
 writing a second data item from the first named pipe to the first priority queue, wherein the second data item is obtained from the processing of the first data item; and
 sending, over the TCP connection to the client device, the second data item from the first priority queue of the first VC according to the first data priority.

12. The method of claim 10, further comprising loading the data into a pre-allocated memory space at the kernel level of operation of the operating system.

13. The method of claim 10, further comprising removing the first named pipe for the first VC upon ending the respective service.

14. A network component for handling client data in a virtual desktop infrastructure (VDI) environment, the network component comprising:
 a processor; and
 a computer readable storage medium storing programming for execution by the processor, the programming including instructions to:
 establish a network connection with a plurality of virtual channels (VCs) between the network component and a client device, wherein the network component comprises an operating system, wherein the network component is configured to operate at a user level of the operating system, and wherein the client device is configured to communicate with the network component using the network connection;

establish, using the user level of the operating system, a plurality of priority queues corresponding to the plurality of VCs for a plurality of respective services provided to the client device, wherein each of the plurality of VCs comprises a VC priority;

receive a first data item from the client device using the network connection, wherein the first data item is associated with a first VC in the plurality of VCs and comprises a first data priority;

store the first data item in a first priority queue in the plurality of priority queues corresponding to the first VC at a position relative to other data items in the first priority queue according to the first data priority; and process the plurality of priority queues according to respective VC priorities, wherein data items in each of the plurality of priority queues are processed according to respective data priorities, wherein the user level of the operating system is different than a kernel level of the operating system.

15. The network component of claim 14, wherein the network connection is a Transmission Control Protocol (TCP) connection.

16. The network component of claim 14, wherein the programming includes further instructions to pre-allocate, at the kernel level of the operating system, a shared memory space for executing the services, wherein the shared memory space at the kernel level is sharable by service modules and kernel modules.

17. The network component of claim 14, wherein the programming includes further instructions to:
   establish a plurality of named pipes corresponding to the services; and
   communicate, via the named pipes, with service modules for executing the services.

18. The network component of claim 17, wherein the programming includes further instructions to remove the named pipes upon ending the respective services.

19. The network component of claim 14, wherein the programming includes further instructions to:
   assign a plurality of VC IDs for the respective VCs; and
   frame data of the services on the respective VCs as a combination of the VC IDs and the data of the respective services.

20. The network component of claim 14, wherein the network component comprises an executable file at an operation system (OS) user layer of the network component.

21. The method of claim 1, further comprising
   storing a second data item in the first priority queue at a position relative to other data items in the first priority queue according to the first data priority, wherein the processing the plurality of priority queues comprises processing the first data item to obtain the second data item; and
   transmitting the second data item to the client according to the VC priority of the first priority queue and the first data priority.

22. The method of claim 1, wherein the first data item is stored in a shared memory space at a kernel level of the operating system.

* * * * *